(12) United States Patent
Maeda et al.

(10) Patent No.: US 6,958,675 B2
(45) Date of Patent: Oct. 25, 2005

(54) VEHICLE REMOTE CONTROLLER

(75) Inventors: Toru Maeda, Aichi (JP); Hirofumi Okada, Aichi (JP); Toshihiro Nagae, Aichi (JP); Yoshihito Mizuno, Aichi (JP); Yutaka Yoshida, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 302 days.

(21) Appl. No.: 10/030,319

(22) PCT Filed: Apr. 24, 2001

(86) PCT No.: PCT/JP01/03512

§ 371 (c)(1),
(2), (4) Date: Mar. 26, 2002

(87) PCT Pub. No.: WO01/81133

PCT Pub. Date: Nov. 1, 2001

(65) Prior Publication Data

US 2002/0105411 A1 Aug. 8, 2002

(30) Foreign Application Priority Data

Apr. 26, 2000 (JP) ........................................ 2000-125663

(51) Int. Cl.[7] ............................................... G05B 19/00
(52) U.S. Cl. ...................... 340/5.61; 340/5.6; 340/5.64; 340/5.2; 340/5.5; 340/5.33; 340/10.1; 340/10.2; 340/10.4; 340/10.5; 341/176; 307/10.1; 307/10.2; 307/10.3
(58) Field of Search ............................... 340/5.61, 5.72, 340/426.1, 825.72, 825.69, 5.2, 5.6, 5.64, 10.34, 5.33, 10.6; 307/10.3, 10.1, 10.2

(56) References Cited

U.S. PATENT DOCUMENTS

| 6,188,326 B1 * | 2/2001 | Flick ...................... 340/825.69 |
| 6,211,776 B1 * | 4/2001 | Rohrl et al. ........... 340/426.16 |
| 6,525,648 B1 * | 2/2003 | Kubler et al. ............ 340/10.33 |

FOREIGN PATENT DOCUMENTS

| EP | 0 835 790 A2 | 4/1998 |
| JP | 08-268227 | 10/1996 |
| JP | 10-082224 | 3/1998 |
| JP | 10-273015 | 10/1998 |
| JP | 11-091507 | 4/1999 |

* cited by examiner

Primary Examiner—Brian Zimmerman
Assistant Examiner—Vernal Brown
(74) Attorney, Agent, or Firm—Crompton, Seager & Tufte, LLC

(57) ABSTRACT

A vehicle remote controller that reduces the number of parts. The vehicle remote controller includes a portable device carried by a driver and a transceiver (11) arranged in the vehicle to output a request signal for intercommunicating with the portable device and to output a transponder driving radio wave. The transceiver outputs the request signal to either a first area, which is in a vehicle passenger compartment, or an area outside the vehicle, and has a common antenna (14) for outputting the transponder driving radio wave to a second area, which is in the vehicle passenger compartment.

20 Claims, 6 Drawing Sheets

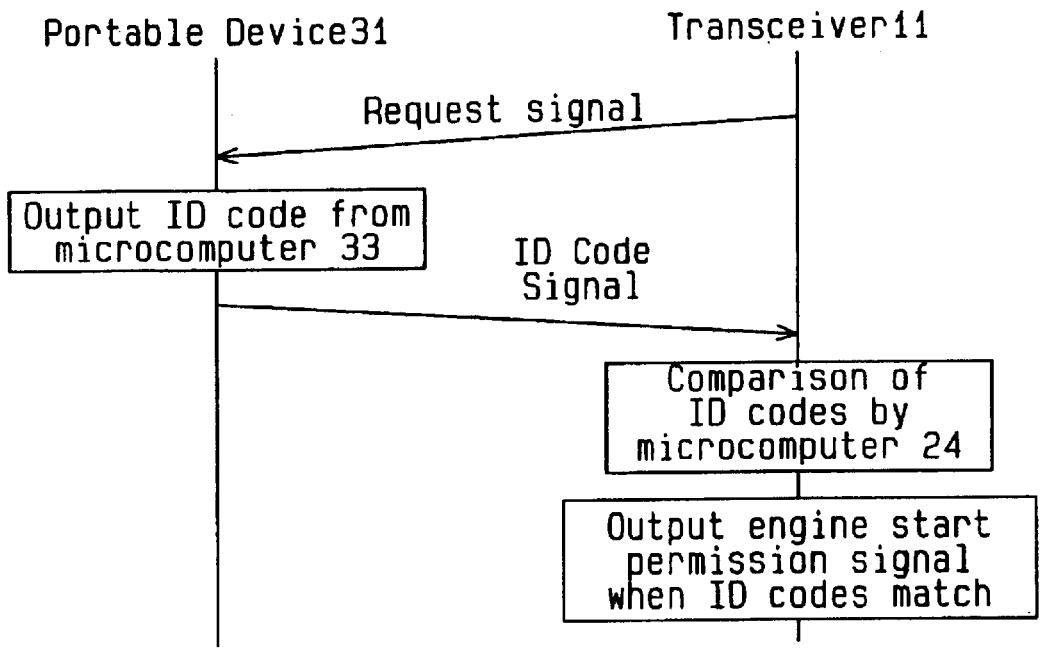
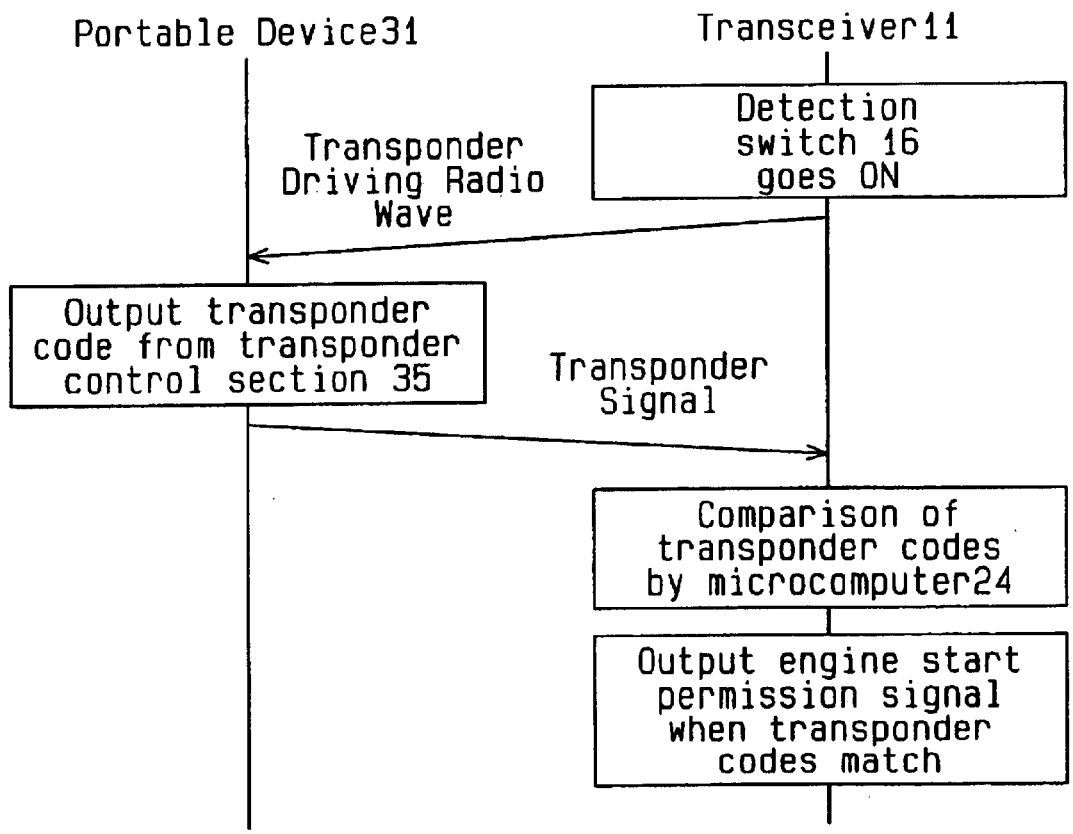

VEHICLE REMOTE CONTROLLER

BACKGROUND OF THE INVENTION

The present invention is related to a vehicle remote controller, and more particularly, to a remote controller having a portable device carried by a driver and a transceiver, which is arranged in the vehicle, to output a request signal for intercommunicating with the portable device and to output a transponder driving radio wave.

Conventionally, cars require not only improvement in basic performance and safety but also improvement in maneuverability. Therefore, for example, a remote controller for a vehicle that remotely controls various devices arranged in the vehicle has been proposed. As an example of a vehicle remote controller, a smart ignition device has been proposed.

The smart ignition device has a portable device carried by a driver and a transceiver arranged in the vehicle. When the driver enters the vehicle, an ID code set in the portable device, which is carried by the driver, is automatically compared to an ID code set in the transceiver, which is arranged in the vehicle. When the two ID codes match, the engine is allowed to start. Therefore, the smart ignition device causes burdensome manipulations, such as inserting a mechanical key into a key switch and rotating the key to start the engine, to become unnecessary and improves maneuverability of the vehicle. Moreover, the comparison of the ID codes improves the security level.

The smart ignition device normally does not function when the battery of the portable device goes dead. Therefore, when the battery of the portable device goes dead, a mechanical key attached to the portable device must be used. However, the security level cannot be improved if the engine can be start by the mechanical key.

Therefore, in the prior art, a transponder control section is arranged in the mechanical key and an antenna for outputting a transponder driving radio wave is arranged in a predetermined area in the vehicle including a key switch. When the transponder control section receives the transponder driving radio wave, the transponder control section is activated by the electromotive force induced by a received radio wave to generate a transponder signal including a predetermined transponder code. The transponder signal is transmitted to the transceiver.

A predetermined transponder code is preset in the transceiver. When the transceiver receives the transponder signal, the transponder codes are compared. When the two transponder codes match, the transceiver permits the engine to be started by the mechanical key. This improves the security level even when the engine is started by the mechanical key.

In the conventional smart ignition device, the request signal is output in a wide area of the vehicle. Thus, the antenna for outputting the request signal is arranged near the center of the vehicle. The antenna for outputting the transponder driving radio wave is arranged near the key switch to ensure that the transponder driving radio wave is output within a narrow area including the key switch. Therefore, the number of parts and the cost of the smart ignition device are increased by the two antennas, and the necessity for separately arranging the two antennas decreases working efficiency.

BRIEF SUMMARY OF THE INVENTION

It is an object of the present invention to provide a vehicle remote controller that decreases the number of parts.

In one perspective of the present invention, a vehicle remote controller includes a portable device carried by a driver and a transceiver arranged in the vehicle to output a request signal for intercommunicating with the portable device and to output a transponder driving radio wave. The transceiver of the vehicle remote controller has a common antenna for transmitting the request signal and the transponder driving radio wave.

In a further perspective of the present invention, a vehicle remote controller includes a transceiver arranged in the vehicle for generating a request signal and a transponder driving radio wave and a portable device carried by a driver, the portable device having a request signal processing circuit for receiving the request signal from the transceiver, generating a first signal based on the request signal, and transmitting the first signal to the transceiver, and a transponder for receiving the transponder driving radio wave, which generates electric power, from the transceiver, generating a transponder signal based on the transponder driving radio wave, and transmitting the transponder signal to the transceiver. The transceiver of the vehicle remote controller includes a common antenna for transmitting the request signal and the transponder driving radio wave to the portable device.

In a further perspective of the present invention, a transceiver of a vehicle remote controller arranged in the vehicle to output a request signal, used to intercommunicate with a portable device carried by a driver, to one of a first area, which is in a vehicle passenger compartment, and an area outside the vehicle passenger compartment, and to output a transponder driving radio wave to a second area in the vehicle passenger compartment. A common antenna transmits the request signal and the transponder driving radio wave.

In each of the above-described structures, the output antenna of the request signal is the same as the output antenna of the transponder driving signal. Therefore, the number of parts and cost of the transceiver are reduced. That is, the number of parts and cost of the vehicle remote controller is decreased.

BRIEF DESCRIPTION OF THE DRAWINGS

The invention, together with objects and advantages thereof, may best be understood by reference to the following description of the presently preferred embodiments together with the accompanying drawings in which:

FIG. 5 is a drawing showing the basic operation of the remote controller of FIG. 4;

FIG. 6 is a drawing showing the operation of the remote controller of FIG. 4 in a transponder mode.

DETAILED DESCRIPTION OF THE PREFERRED EMBODIMENTS

Figure 1:
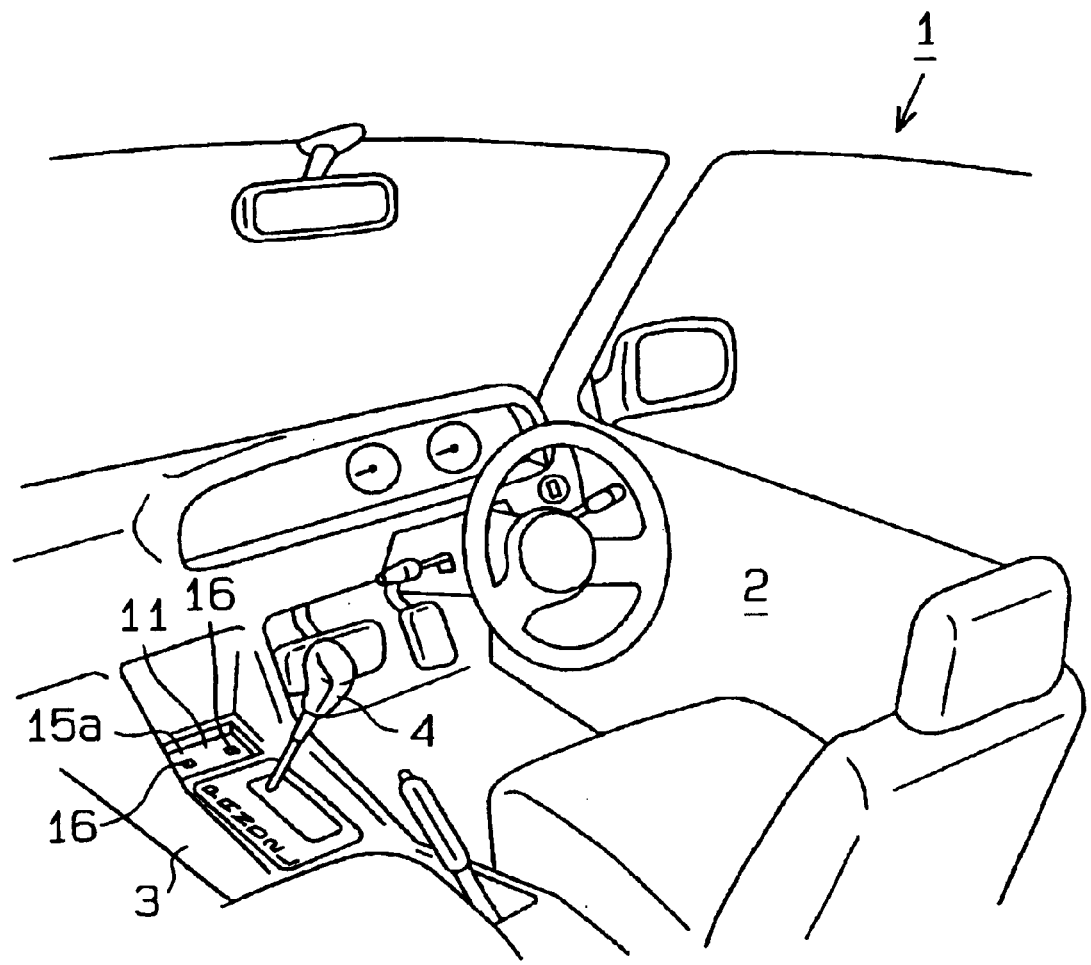
FIG. 1 is a perspective view showing a passenger compartment of a vehicle in which a transceiver of a remote controller according to a preferred embodiment of the present invention is arranged.

FIG. 1 is a perspective view showing a passenger compartment 2 of a vehicle 1, in which a transceiver 11 of a remote controller 10 according to a preferred embodiment of the present invention is arranged. As shown in FIG. 1, the transceiver 11 is arranged on a center console 3 in the passenger compartment 2 of the vehicle 1.

Figure 2:
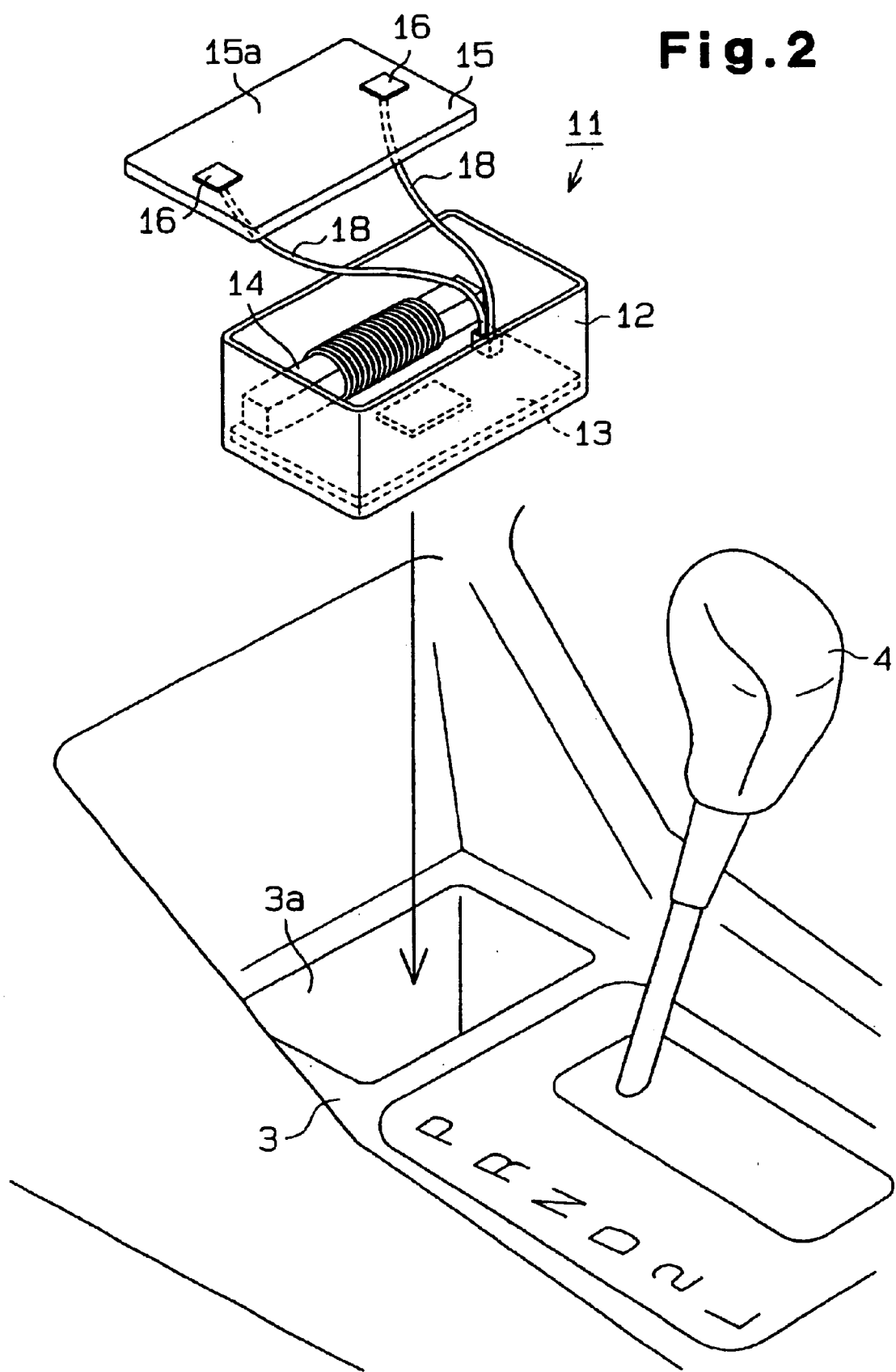
FIG. 2 is a perspective view showing the transceiver of FIG. 1.

As shown in FIG. 2, a recess portion 3a is formed in the forward side, with respect to the moving direction of the vehicle, of a shift lever 4 on the center console 3. The transceiver 11 is embedded in the recess portion 3a. The transceiver 11 has a generally rectangular box-like case 12. A control board 13 and a transmitting/receiving antenna (common antenna) 14 are accommodated in the case 12. The transmitting/receiving antenna 14 includes, for example, a coil antenna, such as a ferrite antenna, and receives a radio wave having a predetermined frequency (134 kHz in the preferred embodiment). The transmitting/receiving antenna 14 is arranged near the center of the vehicle passenger compartment 2. More specifically, the transmitting/receiving antenna 14 is arranged substantially along the center line of the vehicle 1 in the vehicle passenger compartment.

Figure 4:
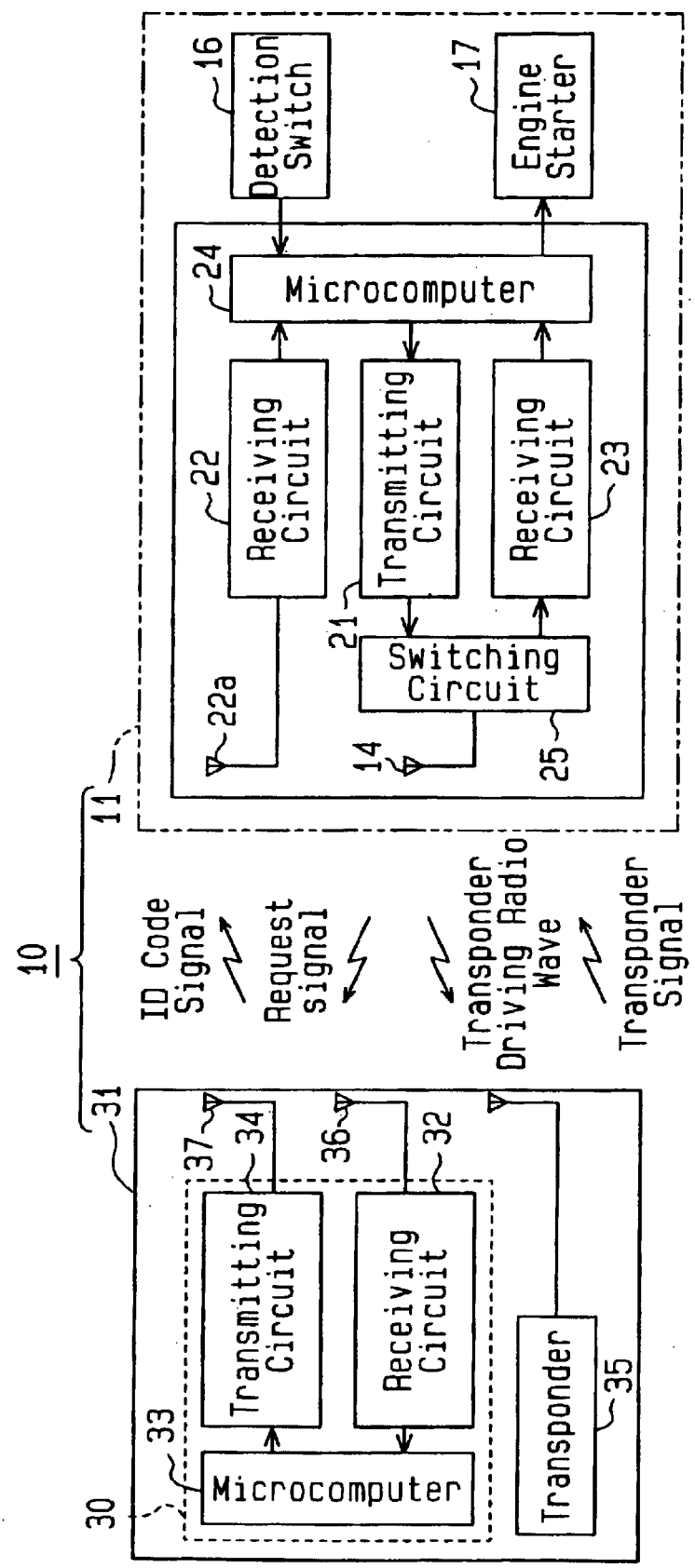
FIG. 4 is a schematic block diagram showing the structure of the remote controller according to the preferred embodiment of the present invention.

As shown in FIG. 2, a cover 15 is mounted fitted in an opened portion of the case 12. Two detection switches 16 are arranged on the cover 15. The two detection switches 16 are connected to the control board 13 by electric wires 18. A portable device 31 shown in FIG. 4 is placed on the upper surface of the cover 15, which defines a mounting portion 15a. The two detection switches 16 are set to be on when the portable device 31 is placed on the mounting portion 15a.

When the transceiver 11 is embedded in the recess portion 3a, the transceiver 11 is electrically connected to a battery of the vehicle 1 and other electric devices by a connector or the like (not shown). The case 12 is fixed to the recess portion 3a by a packing or the like.

A transmitting circuit 21, receiving circuits 22, 23, a microcomputer 24 and a switching circuit 25, which are shown in FIG. 4, are formed on the control board 13. The transmitting circuit 21 and the receiving circuits 22, 23 are each connected to the microcomputer 24. The transmitting/receiving antenna 14 is connected to the transmitting circuit 21 and the receiving circuit 23 via the switching circuit 25. The switching circuit 25 is a circuit for selectively connecting the transmitting/receiving antenna 14 to the transmitting circuit 21 and the receiving circuit 23. A receiving antenna 22a is connected to the receiving circuit 22.

The transmitting circuit 21 converts the request signal provided from the microcomputer 24 to a radio wave having a predetermined frequency and outputs the radio wave via the transmitting/receiving antenna 14. The transmitting circuit 21 converts the transponder driving signal provided from the microcomputer 24 to a radio wave having a predetermined frequency to generate a transponder driving radio wave and outputs the driving radio wave via the transmitting/receiving antenna 14. The request signal and the transponder driving radio wave are output from the transmitting/receiving antenna 14. That is, the transmitting/receiving antenna 14 serves both as an output antenna for the request signal and an output antenna for the transponder driving radio wave.

Figure 3:
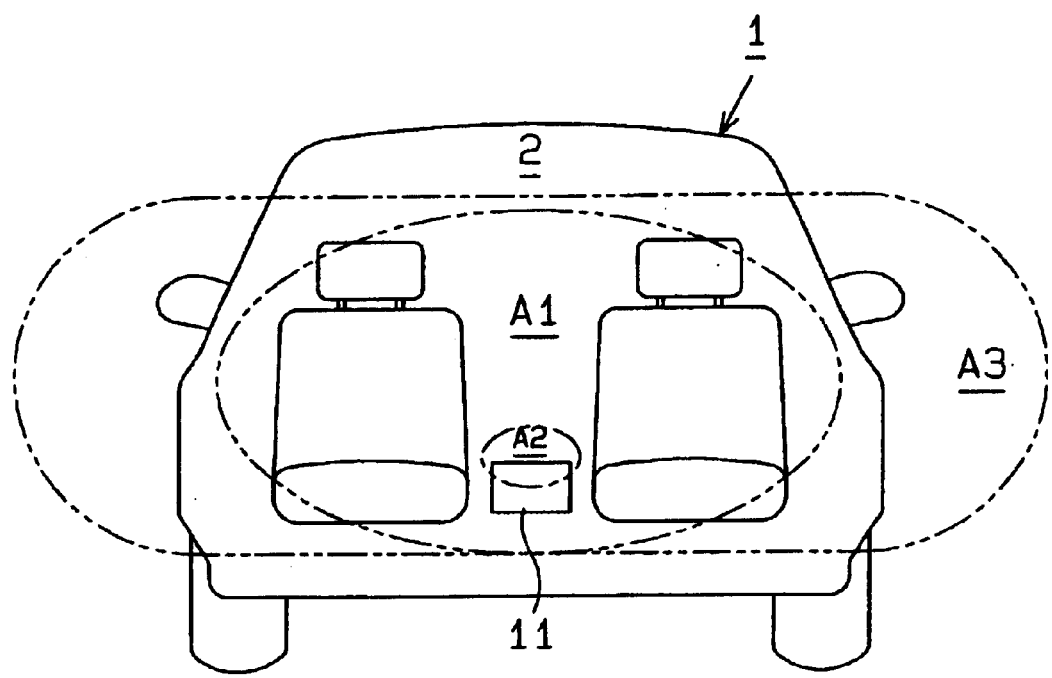
FIG. 3 is a schematic front view of the vehicle showing output areas of a request signal and a transponder driving radio wave of the transceiver of FIG. 1.

As shown in FIG. 3, the request signal is output in a predetermined area (a first area) A1 in the passenger compartment 2 of the vehicle and the transponder driving radio wave is output in a predetermined area (a second area) A2 near the transceiver 11. Therefore, intercommunication between the portable device 31 and the transceiver 11 in the predetermined areas A1, A2 is enabled. The frequencies of the request signal and the transponder driving radio wave are set to 134 kHz in the preferred embodiment. The effective range of the output area A2 of the transponder driving radio wave is set within an area of about 0.1 m from the transceiver 11 and includes the mounting portion 15a of the cover 15.

The receiving circuit 22 receives an ID code signal from the portable device 31 via the receiving antenna 22a. The receiving circuit 22 demodulates the ID code signal to generate a pulse received signal and provides the pulse received signal to the microcomputer 24. The receiving circuit 23 receives the transponder signal from the portable device 31 via the antenna 14. In this state, the antenna 14 is connected to the receiving circuit 23 by the switching circuit 25. The receiving circuit 23 demodulates the transponder signal to a pulse signal to generate a received signal and provides the received signal to the microcomputer 24.

The detection switches 16 and an engine starter 17 are connected to the microcomputer 24. The microcomputer 24 has a CPU unit including a CPU, a RAM and a ROM (not shown) and outputs either the request signal or the transponder driving signal.

When the microcomputer 24 receives the received signal including the ID code from the receiving circuit 22, the microcomputer 24 compares the preset ID code and the ID code included in the received signal (comparison of ID codes). When the two ID codes match, the microcomputer 24 provides a start permission signal to the engine starter 17.

When the microcomputer 24 receives the received signal including the transponder code from the receiving circuit 23, the microcomputer 24 compares the previously set transponder code and the transponder code included in the received signal (the comparison of the transponder codes). When the two transponder codes match, the microcomputer 24 supplies the start permission signal to the engine starter 17.

As shown in FIG. 4, the portable device 31 intercommunicates with the transceiver 11 and is carried by a driver. The remote controller 10 includes the portable device 31 and the transceiver 11. As shown in FIG. 4, the portable device 31 includes a request signal processing circuit 30 and a transponder 35 (a transponder control section).

The request signal processing circuit 30 includes a receiving circuit 32, a microcomputer 33 and a transmitting circuit 34. The receiving circuit 32 receives the request signal from the transceiver 11 via a receiving antenna 36 and provides the request signal to the microcomputer 33. When the microcomputer 33 receives the request signal from the receiving circuit 32, the microcomputer 33 provides an ID code signal (a first signal), which includes a predetermined preset ID code, to the transmitting circuit 34. The transmitting circuit 34 demodulates the supplied ID code signal to a radio wave having a predetermined frequency and externally transmits the radio wave via a sending antenna 37.

When the transponder control section 35 obtains sufficient energy from electromagnetic waves, the transponder control section 35 outputs a transponder signal, which includes a preset predetermined transponder ID code (a transponder code). That is, when the transponder control section 35 receives the transponder driving radio wave from the transceiver 11, the transponder control section 35 outputs the transponder signal. The frequency of the ID code signal radio wave in the preferred embodiment is set to 300 Mhz and the frequency of the transponder signal radio wave is set to 134 kHz.

Next, the basic operation of the remote controller 10 will be explained. FIG. 5 schematically shows the operation of the remote controller 10.

When the remote controller 10 is operated, the request signal is intermittently output from the transmitting/receiving antenna 14 of the transceiver 11 in the predetermined area A1. The request signal is constantly output when the remote controller 10 is operating.

When the portable device 31 receives the request signal in the predetermined area A1, the portable device 31 automatically transmits the ID code signal in response to the request signal. That is, when a driver carrying the portable device 31 enters the vehicle, the ID code signal is automatically transmitted from the portable device 31. The portable device 31 is normally set in a stand-by mode for receiving the request signal and transmits the ID code signal only when receiving the request signal.

When receiving the ID code signal, the transceiver 11 compares the ID code included in the ID code signal with its own ID code. When the two ID codes match, the microcomputer 24 of the transceiver 11 provides the engine start permission signal to the engine starter 17. The engine starter 17 receives the engine start permission signal and puts the engine in a starting stand-by state. Therefore, the driver can start the engine by manipulating a predetermined engine start switch (not shown) or etc. arranged in the passenger compartment 2 of the vehicle. That is, the remote controller 10 has the functions of a smart ignition device. Therefore, the driver can start the engine without performing burdensome operations such as using the mechanical key.

Normally, the portable device of the remote controller is driven by electric power supplied from a built-in battery (not shown). Therefore, when the battery of the portable device goes dead, the portable device cannot start the engine start through the basic operation. However, in the preferred embodiment, the intercommunication between the transceiver 11 and the portable device 31 enables the starting of the engine even when the battery of the portable device 31 goes dead.

Hereinafter, the operation of the remote controller 10 in the preferred embodiment when the battery of the portable device 31 goes dead will be explained. FIG. 6 schematically shows the operation of the remote controller 10 when the battery of the portable device 31 goes dead.

When the battery of the portable device 31 goes dead, the driver places the portable device 31 on the mounting portion 15a of the transceiver 11. This causes the detection switches 16 to go on and provides a detection signal to the microcomputer 24 of the transceiver 11. When receiving the detection signal, the microcomputer 24 switches the output signal of the transceiver 11 from the request signal to the transponder driving radio wave. Therefore, the transponder driving radio wave is output from the antenna 14. Then, induced electromotive force is generated in the portable device 31 by the electromagnetic induction of the transponder driving radio wave. The induced electromotive force activates the transponder control section 35, and the transponder control section 35 outputs the transponder signal.

The transceiver 11 receives the transponder signal through the transmitting/receiving antenna 14 and compares the transponder code included in the transponder signal with its own transponder code. When the two codes match, the microcomputer 24 of the transceiver 11 provides the engine start permission signal to the engine starter 17. The engine starter 17 receives the start permission signal and puts the engine in the starting stand-by state.

Therefore, in the preferred embodiment, even when the battery of the portable device 31 goes dead, the driver may enable the starting of the engine by placing the portable device 31 on the mounting portion 15a. That is, even when the battery of the portable device 31 goes dead, the driver can start the engine without using a mechanical key.

The remote controller 10 of the preferred embodiment has the following advantages.

(1) The transmitting/receiving antenna 14 of the transceiver 11 outputs the request signal and the transponder driving radio wave. That is, the output antenna of the request signal and the output antenna of the transponder driving signal are commonly used. Therefore, the number of parts of the transceiver 11, that is, the number of parts of the remote controller 10, and costs are decreased.

(2) The transmitting/receiving antenna 14 is near the center of the vehicle passenger compartment 2 (near the center line of the vehicle 1 in the passenger compartment 2). Therefore, the output area A1 of the request signal is larger compared to when the transmitting/receiving antenna 14 is arranged in the key switch or near a door.

(3) Generally, the reliability of the smart ignition device increases when the request signal is not output outside the vehicle. Thus, it is preferred that the request signal be output only in the vehicle passenger compartment 2. In the preferred embodiment, the transmitting/receiving antenna 14 is arranged on the center console 3. Therefore, the transmitting/receiving antenna 14 is located lower than the windshield or the door windows. This shields the request signal with the body of the vehicle 1 and prevents the request signal from being output from the vehicle.

(4) Even when the battery of the portable device 31 goes dead, the driver may start the engine by placing the portable device 31 on the mounting portion 15a without using the mechanical key.

It should be apparent to those skilled in the art that the present invention may be embodied in many other specific forms without departing from the spirit or scope of the invention.

<Further Embodiment>

Figure 7:
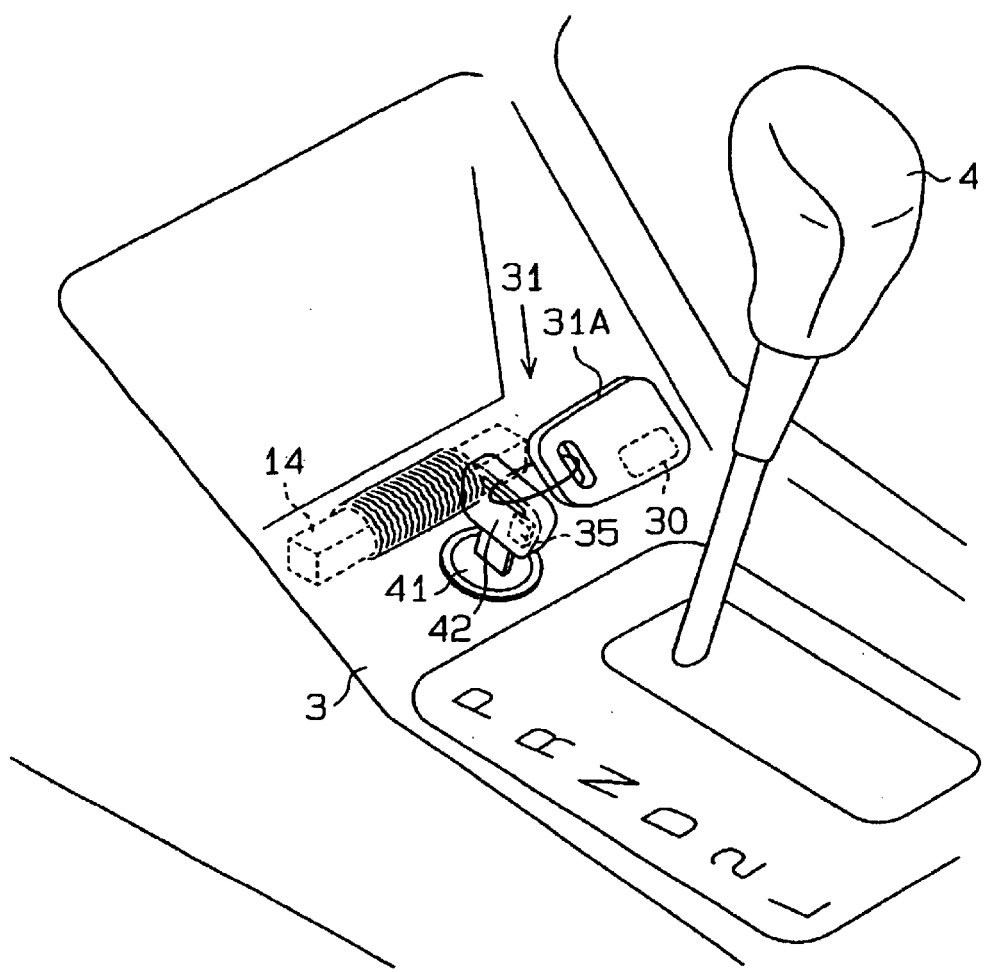
FIG. 7 is an enlarged partial perspective view showing part of a center console of the vehicle used in a further embodiment.

As shown in FIG. 7, a key switch 41 may be arranged on the center console 3, and the transponder control section 35 may be provided in a mechanical key 42. In this case, the portable device 31 includes a portable body 31A, which incorporates the request signal processing circuit 30, and the mechanical key 42. When the driver inserts the mechanical key 42 into the key switch 41, the transponder codes are compared. The mechanical key 42 starts the engine when the transponder codes match.

The transceiver 11 does not have to be arranged on the center console 3 and may be arranged anywhere as long as it is located near the center line of the vehicle 1 in the passenger compartment 2. Further, the transceiver 11 may be arranged anywhere in the passenger compartment 2 of the vehicle such as on the driver', seat or in the instrument panel. It is desirable that the transceiver 11 be arranged near the center of the passenger compartment 2 of the vehicle (away from the door).

The mounting portion 15a of the portable device 31 does not have to be arranged on the cover 15 and may be arranged anywhere in the output area A2 of the transponder driving radio wave. Moreover, instead of the mounting portion 15a, an insertion opening may be formed in the transceiver 11 so that when the driver inserts the portable device 31 in the insertion opening, the engine can be started by the transponder function.

The transmitting/receiving antenna 14 may be arranged outside the case 12.

The number of the detection switch 16 is not limited to two and may be one, three, or more than three. The detecting means is not limited to the detection switch 16 and may be a contact sensor, a proximity sensor, or the like.

A smart entry function may be added to the remote controller 10. More specifically, the output level of the request signal output from the transmitting/receiving antenna 14 may be varied, and the request signal may be output in a predetermined area A3 near the vehicle 1, as shown in FIG. 3. Intercommunication between the portable device 31 and the transceiver 11 in the predetermined area A3 locks and unlocks a door. In this case, the driver may lock and unlock the door without performing any manipulations. This improves maneuverability.

It should be apparent to those skilled in the art that the present invention may be embodied in many other specific forms without departing from the spirit or scope of the invention.

What is claimed is:

1. A vehicle remote controller comprising a portable device carried by a driver and a transceiver arranged in a vehicle having a vehicle passenger compartment to output a request signal for intercommunicating with the portable device and to output a transponder driving radio wave, wherein said transceiver has a common antenna for selectively transmitting the request signal and the transponder driving radio wave, and wherein the vehicle passenger compartment includes a first area where the request signal is output and a second area smaller than the first area where the transponder driving radio wave is output.

2. The vehicle remote controller according to claim 1, wherein said transceiver outputs the request signal in at least one of inside the vehicle passenger compartment and outside the vehicle passenger compartment and outputs the transponder driving radio wave in the inside of the vehicle passenger compartment.

3. The vehicle remote controller according to claim 2, wherein said antenna is arranged near a center of the vehicle.

4. The vehicle remote controller according to claim 3, wherein said antenna is arranged on a center console.

5. The vehicle remote controller according to claim 4, wherein said transceiver has, within the vehicle passenger compartment, a mounting portion, on which the portable device is place, and a detecting means, which is arranged on the mounting portion to detect whether the portable device is placed, and when the detecting means detects that the portable device is placed on the mounting portion, the transceiver outputs the transponder driving radio wave.

6. The vehicle remote controller according to claim 2, wherein said vehicle has a key switch arranged in the vehicle for being able to start an engine, and the portable device has a mechanical key and the mechanical key has a transponder for receiving the transponder driving radio wave for generating electric power from the transceiver and generating a transponder signal according to the transponder driving radio wave and transmitting the transponder signal to the transceiver.

7. A vehicle remote controller comprising a transceiver arranged in a vehicle having a vehicle passenger compartment to generate a request signal and a transponder driving radio wave, and a portable device carried by a driver, the portable device having a request signal processing circuit for receiving the request signal from the transceiver, generating a first signal based on the request signal, and transmitting the first signal to the transceiver, and a transponder for receiving the transponder driving radio wave, which generates electric power, from the transceiver, generating a transponder signal based on the transponder driving radio wave, and transmitting the transponder signal to the transceiver, wherein said transceiver includes a common antenna for selectively transmitting the request signal and the transponder driving radio wave to the portable device, and wherein the vehicle passenger compartment includes a first area where the request signal is output and a second area smaller than the first area where the transponder driving radio wave is output.

8. The vehicle remote controller according to claim 7, wherein said transceiver outputs the request signal to at least one of the vehicle passenger compartment and outside the vehicle passenger compartment and outputs the transponder driving radio wave to the inside of the vehicle passenger compartment.

9. The vehicle remote controller according to claim 8, wherein said antenna is arranged near a center of the vehicle.

10. The vehicle remote controller according to claim 9, wherein said antenna is arranged on a center console.

11. The vehicle remote controller according to claim 10, wherein said transceiver has, within the vehicle passenger compartment, a mounting portion, on which the portable device is placed, and a detecting means, which is arranged on the mounting portion, to detect whether the portable device is placed, and when the detecting means detects that the portable device is placed on the mounting portion, the transceiver outputs the transponder driving radio wave.

12. A transceiver of a vehicle remote controller arranged in a vehicle having a vehicle passenger compartment to output a request signal, used to intercommunicate with a portable device carried by a driver, to one of inside a vehicle passenger compartment and outside the vehicle passenger compartment, and to output a transponder driving radio wave to the inside of the vehicle passenger compartment, wherein said transceiver comprises a common antenna for selectively transmitting the request signal and the transponder driving radio wave, and wherein the vehicle passenger compartment includes a first area where the request signal is output and a second area smaller than the first area where the transponder driving radio wave is output.

13. The vehicle remote controller according to claim 1, wherein the request signal and the transponder driving radio wave have the same frequency.

14. The vehicle remote controller according to claim 7, wherein the request signal and the transponder driving radio wave have the same frequency.

15. The transceiver according to claim 12, wherein the request signal and the transponder driving radio wave have the same frequency.

16. The vehicle remote controller according to claim 1, wherein the portable device transmits a transponder signal and the common antenna is used to receive the transponder signal from the portable device.

17. The vehicle remote controller according to claim 7, wherein the portable device transmits a transponder signal and the common antenna is used to receive the transponder signal from the portable device.

18. The transceiver according to claim 12, wherein the portable device transmits a transponder signal and the common antenna is used to receive the transponder signal from the portable device.

19. A vehicle remote controller comprising:
a portable device carried by a driver; and
a transceiver arranged in a vehicle having a vehicle passenger compartment to output a request signal for intercommunicating with the portable device and to output a transponder driving radio wave;

wherein the vehicle passenger compartment includes a first area where the request signal is output and a second area smaller than the first area where the transponder driving radio wave is output.

20. A vehicle remote controller comprising:

a transceiver arranged in a vehicle having a vehicle passenger compartment to generate a request signal and a transponder driving radio wave; and a portable device carried by a driver, the portable device having a request signal processing circuit for receiving the request signal from the transceiver, generating a first signal based on the request signal, and transmitting the first signal to the transceiver, and a transponder for receiving the transponder driving radio wave, which generates electric power, from the transceiver, generating a transponder signal based on the transponder driving radio wave, and transmitting the transponder signal to the transceiver;

wherein the vehicle passenger compartment includes a first area where the request signal is output and a second area smaller than the first area where the transponder driving radio wave is output.

\* \* \* \* \*

UNITED STATES PATENT AND TRADEMARK OFFICE
CERTIFICATE OF CORRECTION

PATENT NO. : 6,958,675 B2
DATED : October 25, 2005
INVENTOR(S) : Toru Maeda et al.

It is certified that error appears in the above-identified patent and that said Letters Patent is hereby corrected as shown below:

Column 6,
Line 56, delete "driver'," and insert -- driver's --.

Signed and Sealed this

Twenty-seventh Day of December, 2005

JON W. DUDAS
*Director of the United States Patent and Trademark Office*